UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BLUE DISAZO DYE.

SPECIFICATION forming part of Letters Patent No. 532,125, dated January 8, 1895.

Application filed September 7, 1894. Serial No. 522,340. (Specimens.) Patented in France January 3, 1894, No. 235,271.

*To all whom it may concern:*

Be it known that I, ARTHUR WEINBERG, a citizen of Prussia, and a resident of Frankfort-on-the-Main, Germany, have invented new and useful Improvements in the Production of Blue Disazo Dye-Stuffs, of which the following is a specification.

This invention (for which a patent has been obtained in France, No. 235,271, dated January 3, 1894,) relates to the production of blue disazo dyestuffs, deriving from perichlornaphtol beta 2, beta 3, disulfonic acid and consists in combining this acid with tetrazo compounds of paradiamines, such as benzidin, &c.

The new perichlornaphtolsulfo acid has the constitution—

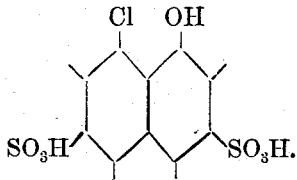

It is formed, if the diazo compound of the alpha 1, alpha 4, amidonaphtol beta 2, beta 3, disulfo acid which has been designated by the letter H in the United States Letters Patent No. 464,125, is brought into contact with cuprous chlorid ($Cu_2Cl_2$).

*Example:* Fifty kilos alpha 1, alpha 4, amidonaphtol beta 2, beta 3, disulfo acid are transformed into the yellow difficultly soluble diazo compound. The latter is filtered off and muriatic acid of ten per cent. is added. At a temperature of 10° centigrade a solution of five kilos cuprous chlorid is then added and this temperature is maintained stirring well at the same time, until the yellow color has disappeared, and the solution is complete. Then the copper is precipitated with sulfid of hydrogen, the sulfid of copper is filtered off, and the filtrate is saturated with common salt at the boiling point. When cold, the acid sodium salt of the thus formed chlornaphtoldisulfo acid is precipitated in colorless crystals in almost theoretical quantity.

The acid salts of chlornaphtolitisulfo acid crystallize well. The neutral salts are very easily soluble, and their solutions show no fluorescence. By the action of chlorid of iron they take a dark green shade.

The acid reacts easily with diazo bodies. If combined with tetrazo bodies, it produces disazo dyestuffs of great fastness and great purity of shade.

The application of the new acid for non-symmetrical combinations is of special value and may be carried out as follows: 24.4 kilos diamidodiphenolether are transformed into their tetrazo compound. Then a neutral solution of thirty-four kilos perichlornaphtoldisulfo acid is added, and the mixture is introduced into a cold solution containing an excess of soda. The red colored intermediate body is at once formed. To this a solution of twenty-four kilos alpha 1, alpha 2, naphtolsulfo acid is added. After a short time the formation of the dye-stuff is terminated. The dyestuff is precipitated with common salt. It dyes unmordanted cotton a blue shade.

Having thus described my invention and in what manner it may be performed, what I claim, and desire to secure by Letters Patent, is—

1. The process of producing blue disazo-dyestuffs which consists in the production of perichlornaphtoldisulfo acid, by treating the diazo-derivative of amidonaphtoldisulfo acid H with cuprous chlorid, and in combining the thus obtained acid with tetrazo bodies in an alkaline solution substantially as described.

2. The blue dyestuff having the constitution:

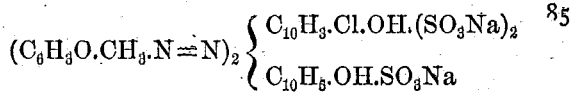

which is a dark blue or black powder, readily soluble in water with violet blue color, insoluble in alcohol, dissolving in concentrated sulfuric acid with greenish blue color, the latter solution forming a violet precipitate by an excess of water, and dyeing unmordanted cotton a blue shade in alkaline or neutral baths substantially as described.

In testimony that I claim the foregoing as my invention I have signed my name, in presence of two witnesses, this 25th day of August, 1894.

ARTHUR WEINBERG.

Witnesses:
ALVESTO S. HOGUE,
JEAN GRUND.

It is hereby certified that in Letters Patent No. 532,125, granted January 8, 1895, upon the application of Arthur Weinberg, of Frankfort-on-the-Main, Germany, for an improvement in "Blue Disazo Dyes," errors appear in the printed specification requiring correction as follows: In line 29, page 1, the number "464,125" should read *464,135;* line 48, same page, the word "chlornaphtolitisulfo" should read *chlornaphtoldisulfo,* and in line 50, same page, the word "and" should be stricken out; and that the said Letters Patent should be read with these corrections therein that the same may conform to the record of the case in the Patent Office.

Signed, countersigned, and sealed this 22d day of January, A. D. 1895.

[SEAL.]

JNO. M. REYNOLDS,
*Assistant Secretary of the Interior.*

Countersigned:
JOHN S. SEYMOUR,
*Commissioner of Patents.*